United States Patent [19]
Mirza et al.

[11] Patent Number: 5,991,616
[45] Date of Patent: Nov. 23, 1999

[54] METHOD FOR INTEGRATED BILLING IN AN INTEGRATED WIRELINE-WIRELESS SYSTEM

[75] Inventors: Arshad Mirza, Plano; Susanna Liem, Fort Worth, both of Tex.

[73] Assignee: Samsung Telecommunications America, Richardson, Tex.

[21] Appl. No.: 08/942,715

[22] Filed: Oct. 2, 1997

[51] Int. Cl.[6] .................................................. H04Q 7/24
[52] U.S. Cl. .......................................... 455/406; 455/461
[58] Field of Search ..................................... 455/405, 406, 455/408, 426, 428, 432, 433, 435, 436, 438, 440, 445, 456, 461, 560; 379/34, 112–115, 119, 250, 134, 220, 229

[56] References Cited

U.S. PATENT DOCUMENTS

| | | | |
|---|---|---|---|
| 5,657,375 | 8/1997 | Connolly et al. | 455/450 |
| 5,664,005 | 9/1997 | Emery et al. | 455/436 |
| 5,712,908 | 1/1998 | Brinkman et al. | 379/119 |
| 5,758,281 | 5/1998 | Emery et al. | 455/435 |
| 5,845,211 | 12/1998 | Roach, Jr. | 455/436 |

*Primary Examiner*—Thanh Cong Le
*Attorney, Agent, or Firm*—Jones Volentine, L.L.P.

[57] ABSTRACT

A method of integrating wireless and wireline billing information in an integrated wireless-wireline system. Existing Automatic Measurement Accounting (AMA) capabilities resident in the Advanced Intelligent Network (AIN) Service Control Point (SCP) of the wireline section are leveraged, thereby avoiding development of an independent billing capability in the wireless section. Problems associated with the allocation and exchange of the wireless call identifier are avoided.

11 Claims, 1 Drawing Sheet

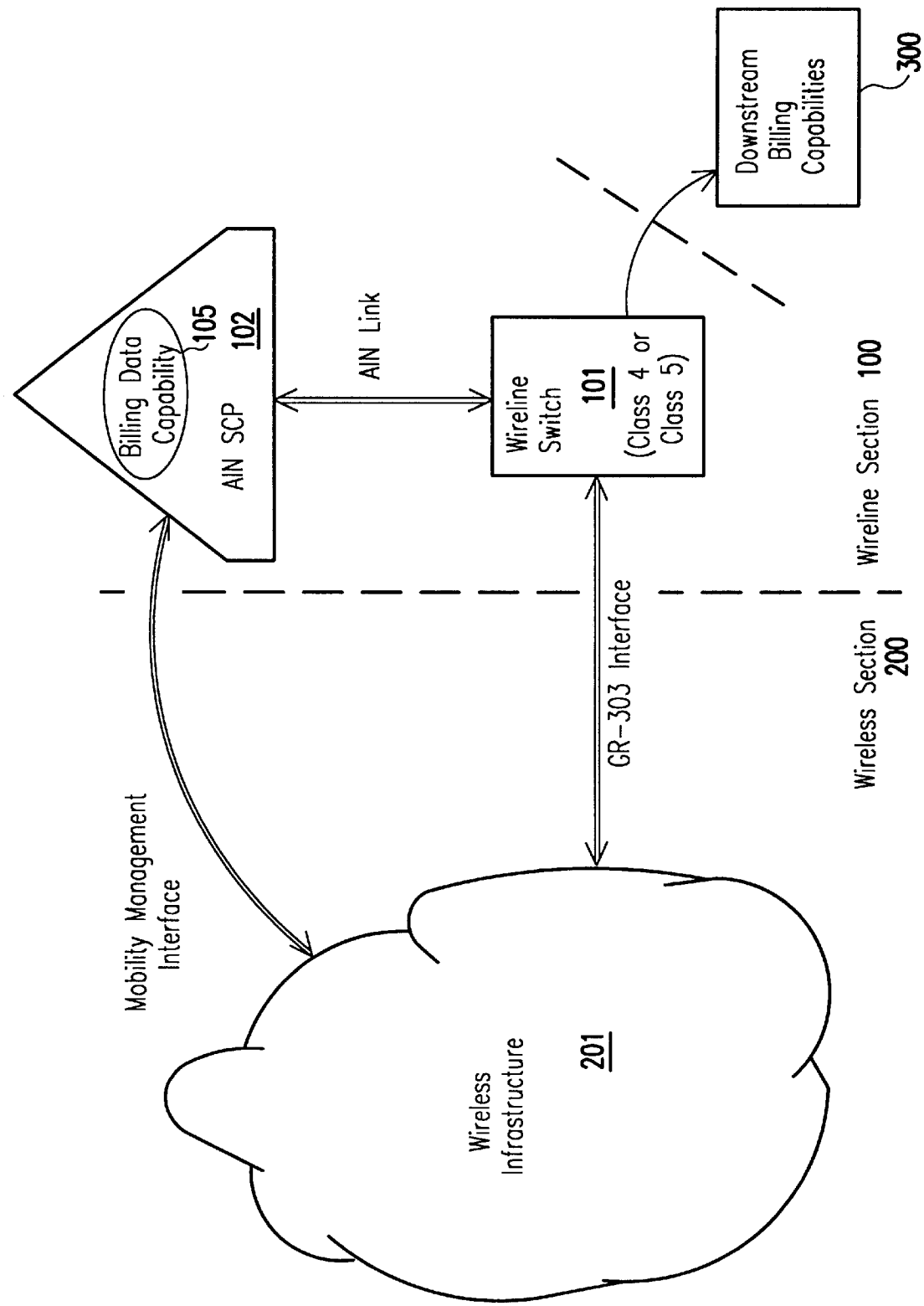

METHOD FOR INTEGRATED BILLING IN AN INTEGRATED WIRELINE-WIRELESS SYSTEM

BACKGROUND OF THE INVENTION

1. Field of the Invention

The present invention relates to a communication system having an integrated wireline-wireless system (IWWS) architecture. More particularly, the present invention relates to a method for integrating billing capabilities in the IWWS.

2. Description of the Related Art

Recent efforts to expand wireless communication and to import wireline features and performance into wireless communication systems have resulted in dramatic changes to network architecture. An IWWS has been proposed in U.S. application Ser. No. 08/942,895, filed Oct. 2, 1997 (Attorney Docket No. STA.001), which is incorporated herein by reference.

The proposed IWWS provides an architecture which does not require a Mobile Switching Center (MSC), but which effectively uses existing wireline switching equipment and capabilities to provide integrated wireless/wireline services to wireless users. The resulting "meld" of wireless communication system components with wireline network components offers many commercial and technical advantages to service providers. For example, the IWWS architecture allows service providers to reduce network equipment purchases, to lower maintenance costs, and to simplify equipment integration. In fact, service providers offering wireline and wireless services have the option of leveraging existing wireline capabilities, without recourse to a separately procured MSC, to effect lower cost wireless service.

Historically, wireline and wireless sections of a network, integrated or otherwise, have respectively collected separate billing data and produced separate billing records. Each wireless call within the network was allocated a unique identifier common to the wireline and wireless billing records. This identifier was subsequently used to merge wireline and wireless billing records. Several investigations have considered the problem of allocating the identifier, and the problem of communicating the identifier between the wireless and wireline sections.

The term "call," as used herein, refers broadly to PCS, fax, and other data exchanges, as well as voice data exchanges. The term "communicat[ing]" refers to a broad class of information exchanges between network sections and elements. Communication may be made via hardware and/or open air interfaces, and may involve complex, bi-directional hand-shaking as is commonly understood in the telecommunications field.

In addition to the wireless call identifier, other mechanisms and methodologies have been proposed to allow downstream merging of the wireless and wireline billing records. At a minimum, such "post-processing" requires a significant extra step with its associated time and cost. More commonly, the post-processing of separately acquired wireless and wireline billing data requires the development and maintenance of hardware and software to perform the merging function.

SUMMARY OF THE INVENTION

Billing is one wireline capability which can be effectively leveraged in the proposed IWWS. The method of the present invention provides a truly integrated billing capability for the wireline and wireless sections of the network. In so doing, the present invention leverages existing Automatic Measurement Accounting (AMA) capabilities resident in the Advanced Intelligent Network (AIN) Service Control Point (SCP) of the wireline section, and avoids the development of an independent billing capability in the wireless section. Further, the problems associated with the allocation and exchange of the wireless call identifier are avoided.

The term "billing capabilit[ies]" refers to any combination of steps or functions performed by the network to identify billing data for a user. Possible sequences of specific steps, and their relationship, are many. Several examples are given below, but one of ordinary skill will recognize that many specific series of steps or functions might be performed to identify billing data.

The term "billing functions" refers to the collection of raw billing data, or call detail recording, and the formatting of this raw billing data into standard Bellcore AMA Format (BAF).

In one aspect, the present invention provides a method in which a first message (a qualification request message) including an Mobile Identity Number (MIN), and preferably, cell identification (ID) information is communicated from the wireless section to the AIN SCP via the mobility management interface upon call origination in the wireless section. Upon receiving the first message at the AIN SCP, a start time and first cell ID information are identified at the AIN SCP. Then, when a second message (a call clearing message) is communicated from the wireless section to the AIN SCP via the mobility management interface upon call clearing in the wireless section, a stop time and second cell ID information are identified at the AIN SCP. Billing data is subsequently formulated based upon the start time, the stop time, the first cell ID information, and the second cell ID information.

In another aspect, the present invention provides a method having the steps of communicating a first message (a qualification request message) including a MIN and first cell ID information from the wireless section to an AIN SCP within the wireline section via a mobility management interface upon a call origination in the wireless section, and thereafter terminating the call at a switch in the wireline section. Next, a location response is communicated from the AIN SCP to the wireless section via the mobility management interface, and a first start time is identified at the AIN SCP. If the call is handed off within the wireless section, a second message (a handoff message) including the MIN and second cell ID information is communicated from the wireless section to an AIN SCP via the mobility management interface. Upon receiving the second message at the AIN SCP, a first stop time and a second start time are identified. Thereafter, a third message (a call clearing message) is communicated from the wireless section to the AIN SCP via the mobility management interface upon call clearing in the wireless section, and upon receiving the third message, the AIN SCP identifies a second stop time and third cell ID information at the AIN SCP.

It will be appreciated that the "handoff" step may occur repeatedly throughout the length of a call. Each time handoff occurs in the wireless section, a handoff message including the MIN and the relevant cell ID information is communicated from the wireless section to an AIN SCP via the mobility management interface. Upon receiving each handoff message, the AIN SCP identifies a stop time for the previous phase of the call and identified a start time for the next phase of the call. The terms "first," "second," and "third" as used herein indicate a sequential relationship rather than a specific numerical count. That is, a number of handoff messages may occur between a qualification request message and a clearing call message. Each, however, is similarly accounted.

BRIEF DESCRIPTION OF THE DRAWING

The drawing illustrates a typical IWWS architecture readily adapted to the method of the present invention.

DETAILED DESCRIPTION OF THE INVENTION

In the drawing, wireline section 100 generally comprises a switch 101 and a AIN SCP 102 connected via an AIN link. Switch 101 is typically part of the Public Switch Telephone Network (PSTN) 105, but is shown separately here for clarity.

The wireless section 200 comprises a wireless infrastructure 201 which is typically the combination of a Base Station Controller and a Visited Service Control Point (VSCP). Switch 101 is connected to wireless infrastructure 201 via a GR-303 interface. AIN SCP 102 communicates with wireless infrastructure 201 via a mobility management interface, preferably a modified IS-41 or IS-634 interface. Each of these elements and interfaces is described in detail in the application cited above.

AIN SCP 102 offers existing AMA billing capabilities to wireline section 100. Typically, AIN SCP 102 performs billing functions at the SCP, but the billing data may also be sent in Call Related messages via the AIN link to Switch 101 and correlated with switch based billing data.

Along with other functions heretofore separately performed in wireless section 200, the present invention incorporates wireless billing capabilities into AIN SCP 102. That is, a wireless application service is created in AIN SCP 102 to accurately perform billing functions for calls in wireless section 200.

The raw data required to formulate "wireless billing" preferably constitutes a Mobile Identity Number (MIN), cell identification (ID) information, start time, and end time. Naturally, other data might also be included in the raw data. However, the MIN identifies the account to be billed, and the cell ID information identifies the coverage area within wireless section 200. Cell ID information is used since different wireless air time rates might apply to different coverage areas.

Again referring to the drawing, upon wireless call origination at wireless infrastructure 201, a message indicating call origination or a "qualification request" (first message) is communicated from wireless infrastructure 201 to AIN SCP 102 via the mobility management interface. The conventional qualification request message is always sent to AIN SCP 102 upon call origination and typically includes the MIN of the calling party.

Additionally, the present invention adds cell ID information to the qualification request message. One of the reserve parameters within the qualification request message is used for this purpose.

Upon receiving the qualification request message, AIN SCP undertakes termination of the call at switch 101. As part of the call termination process, a location response message is communicated from AIN SCP 102 to wireless infrastructure 201. At this point, a time "stamp" is taken at AIN SCP 102 for the call. In other words, a (first) start time is identified at AIN SCP 102 for the call. This start time is normally correlated with the cell ID information contained in the qualification request message which indicates the call's point of origin within the wireless section.

Following termination, the call proceeds conventionally, until the point at which the call is handed off within the wireless section. Handoff is performed in wireless infrastructure 201 with the associated handoff complete message being communicated to AIN SCP 102. However, the handoff complete message, which normally includes the MIN, also includes updated (second) cell ID information reflecting the transition of the call from one cell to another within the wireless network.

Upon receiving the handoff complete message via the mobility management interface, AIN SCP 102 identifies a (first) stop time, and another (second) start time. Billing data will subsequently be based on the time measured between the first start time and the first stop time, and as correlated with the (first) cell ID information. Subsequent start and stop times, as identified throughout the call will similarly be correlated with their respective cell ID information to complete the billing data for the call.

Ultimately, when the call clears in wireless section 200 a call clearing message is sent from wireless infrastructure 201 to AIN SCP 102 via the mobility management interface. Again, this message includes, in addition to the MIN, cell ID information. Thus, all start and stop times, along with their associated cell ID information, are captured at AIN SCP 102. Wireless billing data can therefore be directly integrated with wireline billing data without the requirement of any post processing and without the requirement of unique identifiers for wireless calls.

The foregoing embodiments have been given by way of example. The present invention is taught by these examples is not limited thereto. Rather, one of ordinary skill in the art will understand that numerous modifications and alterations can be made to the specific elements comprising network architectures adaptable to the present invention without departing from the scope of the following claims which define the invention.

What is claimed is:

1. A method of integrating wireless billing information with wireline billing information in a communication system having integrated wireless and wireline sections, the method comprising:
   communicating a first message comprising a mobile identity number from the wireless section to an Advanced Intelligent Network (AIN) Service Control Point (SCP) within the wireline section via a mobility management interface upon call origination in the wireless section;
   upon receiving the first message at the AIN SCP, identifying a start time at the AIN SCP;
   communicating a second message from the wireless section to the AIN SCP via the mobility management interface upon call clearing in the wireless section; and
   upon receiving the second message at the AIN SCP, identifying a stop time at the AIN SCP.

2. The method of claim 1, the first message further comprising first cell identification information.

3. The method of claim 2, the second message comprising second cell identification information.

4. The method of claim 3, further comprising:
   formulating billing data based upon the start time, the stop time, the first cell identification information, and the second cell identification information.

5. A method of integrating wireless billing information with wireline billing information in a communication system having integrated wireless and wireline sections, the method comprising:

communicating a first message comprising a mobile identity number from the wireless section to an Advanced Intelligent Network (AIN) Service Control Point (SCP) within the wireline section via a mobility management interface upon a call origination in the wireless section;

terminating the call at a switch in the wireline section;

upon call termination at the switch, communicating a location response from the AIN SCP to the wireless section via the mobility management interface, and identifying a start time at the AIN SCP;

communicating a second message from the wireless section to the AIN SCP via the mobility management interface upon call clearing in the wireless section; and upon receiving the second message at the AIN SCP, identifying a stop time at the AIN SCP.

6. The method of claim 5, the first message further comprising first cell identification information.

7. The method of claim 6, the second message further comprising second cell identification information.

8. The method of claim 7, further comprising:

formulating billing data based upon the start time, the stop time, the first cell identification information, and the second cell identification information.

9. The method of claim 8, further comprising:

formulating billing data based upon the first start time, the first stop time, the first cell identification information, the second start time, the second stop time, and the second cell identification information.

10. The method of claim 5, wherein the switch is one of a Class 4 and a Class 5 switch.

11. A method of integrating wireless billing information with wireline billings information in a communication system having integrated wireless and wireline sections, the method comprising:

communicating a first message comprising a Mobile Identity Number (MIN) and first cell identification information from the wireless section to an Advanced Intelligent Network (AIN) Service Control Point (SCP) within the wireline section via a mobility management interface upon a call origination in the wireless section;

terminating the call at a switch in the wireline section;

upon call termination at the switch, communicating a location response from the AIN SCP to the wireless section via the mobility management interface and identifying a first start time at the AIN SCP;

upon handoff of the call within the wireless section, communicating a second message comprising the MIN and second cell identification information from the wireless section to the AIN SCP via the mobility management interface;

upon receiving the second message at the AIN SCP, identifying a first stop time and a second start time at the AIN SCP;

communicating a third message from the wireless section to the AIN SCP via the mobility management interface upon call clearing in the wireless section; and upon receiving the third message at the AIN SCP, identifying a second stop time at the AIN SCP.

* * * * *